Jan. 24, 1967  R. W. COOK  3,299,937
FEED LIQUID INLET FLOW DEVICE
Filed April 8, 1965
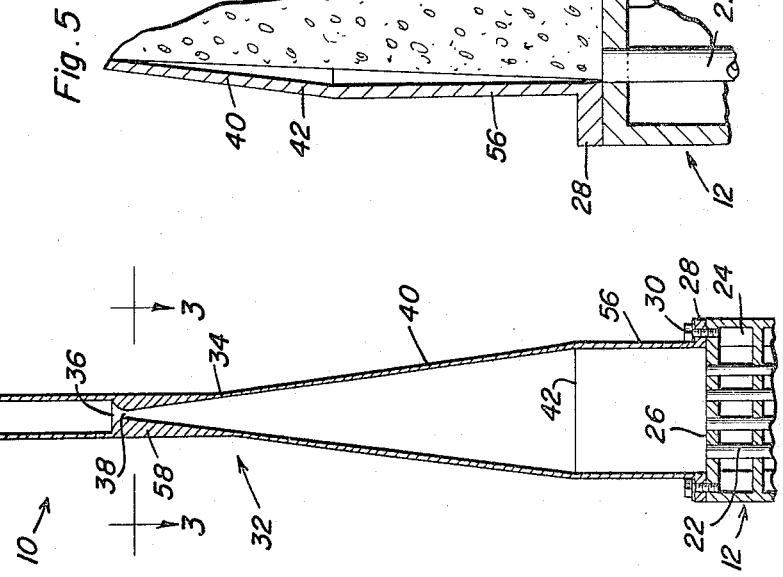
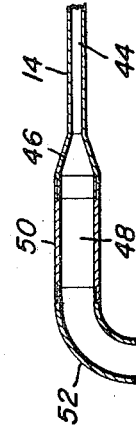
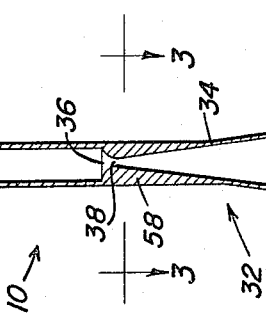
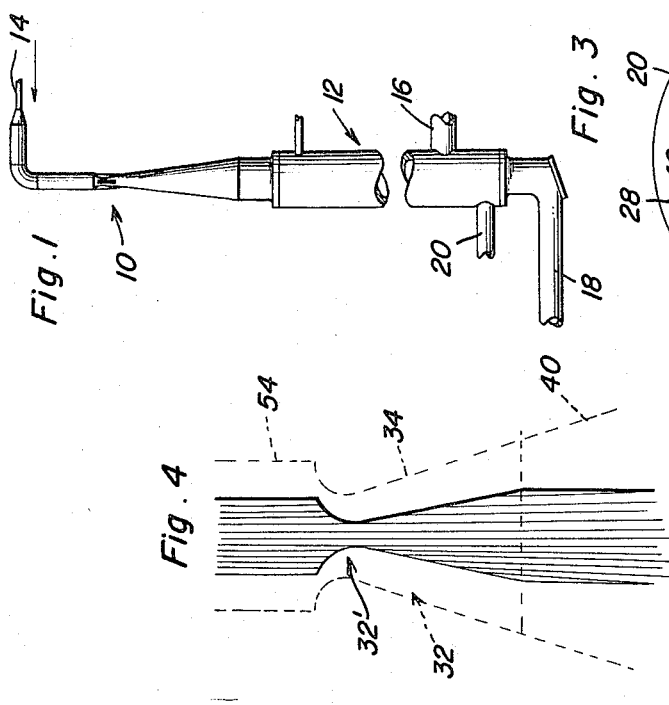
Ralph W. Cook
INVENTOR.

United States Patent Office 3,299,937
Patented Jan. 24, 1967

3,299,937
FEED LIQUID INLET FLOW DEVICE
Ralph W. Cook, 311 Main St., Dunedin, Fla. 33528
Filed Apr. 8, 1965, Ser. No. 446,544
7 Claims. (Cl. 159—2)

This invention relates to improvements in the handling of heat sensitive feed liquids such as orange juice and more particularly is useful as a component of a vacuum evaporator system for concentrating feed liquids such as disclosed and claimed in my prior Patent No. 3,141,807.

In connection with the aforementioned vacuum evaporator system, it is essential that the inlet end of the evaporator, maintained at a predetermined vacuum pressure, is supplied with a liquid-vapor mixture uniformly distributed over the inlet flow area of the evaporator. Toward this end, the feed liquid at a relatively high temperature and pressure compared to the liquid-vapor mixture at the inlet end of the evaporator, is fed through a nozzle component so as to produce the requisite spray pattern for the liquid-vapor mixture as it enters the inlet end of the evaporator at which the upper inlet ends of the heat transfer tubes are exposed. Various devices have been utilized to obtain the desired spray pattern including for example internal vanes and other structural arrangements relying upon the energy that the feed liquid possesses because of pressure differentials to produce the desired results. However, such arrangements are not as effective as desired because of non-uniform distribution of the liquid vapor mixture, high pressure drops and the blocking of the nozzle passages by solids in the feed liquid which are otherwise sufficiently small to pass freely through the remainder of the system. It is therefore a primary object of the present invention to provide an expansion nozzle arrangement through which feed liquid is supplied to the inlet end of a vacuum evaporator in the form of a liquid-vapor mixture having the desired spray pattern without the disadvantages of the aforementioned arrangements. The nozzle arrangement of the present invention therefore relies upon the temperature difference thereacross for operation, as distinguished from the pressure difference as in prior art arrangements.

An additional object of the present invention is to provide a feed liquid expansion nozzle device which employs a De Laval type of nozzle associated with an arrangement in such a manner as to overcome the inherent unsuitability of this type of nozzle for the purposes of the present invention.

These together with other object and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a vacuum evaporator in association with the feed liquid inlet flow device of the present invention;

FIGURE 2 is an enlarged partial sectional view of the assembly illustrated in FIGURE 1, showing the inlet flow device of the present invention;

FIGURE 3 is a transverse sectional view taken substantially through a plane indicated by section line 3—3 in FIGURE 2;

FIGURE 4 is a diagrammatic illustration pertaining to the nozzle design of the present invention; and FIGURE 5 is an enlarged partial section view of a portion of the apparatus showing the flow pattern of the fluid therein.

Referring now to the drawings in detail, it will be observed from FIGURE 1 that the inlet flow device of the present invention generally denoted by reference numeral 10, is associated with a vertically elongated vacuum evaporator 12 of the type disclosed in the aforementioned Patent No. 3,141,807. Thus, feed liquid is supplied to the evaporator 12 from a source connected to conduit 14, the feed liquid passing into the evaporator 12 at the requisite velocity and spray pattern after it has been partially evaporated as a result of its passage through the inlet flow device. A fluid heating medium is therefore supplied to the vacuum evaporator through conduit 16 for heat exchange with the liquid-vapor mixture supplied to the evaporator at the upper inlet end. The liquid-vapor mixture undergoes substantial evaporation within the evaporator 12 and is supplied to a separator by the conduit 18. The conduit 20 is also connected to the lower end of the evaporator for removal of condensate therefrom. As shown in FIGURE 2, the evaporator is provided with a plurality of vertically elongated heat transfer tubes 22. The upper inlet end portions of the heat transfer tubes extend through the upper insulating chamber 24 at the inlet end of the evaporator, terminating at inlet plate member 26. The lower end of the inlet flow device 10 may therefore be provided with an annular mounting flange 28 so that it may be securely fastened by the fasteners 30 to the upper inlet end of the evaporator, with the inlet ends of the heat transfer tubes 22 being in fluid communication therewith and exposed to the liquid-vapor mixture at the desired temperature and velocity conditions.

The inlet flow device of the persent invention utilizes a vertically positioned De Laval type nozzle generally referred to by reference numeral 32 through which the liquid-vapor mixture passes. This type of expansion nozzle while commonly used in connection with steam turbines and steam jets, is ordinarily not suitable in connection with the environment to which the present invention pertains because of geometric requirements associated with this type of nozzle. In order to handle a particular quantity of liquid to be supplied to the inlet end of the evaporator 12, a De Lavel nozzle 32' may be normally designed as shown by solid lines in FIGURE 4 utilizing the basic thermodynamic considerations associated with this type of nozzle resulting in a relatively narrow cone angle as compared with the steeper angle of the divergent portion 34 of the modified nozzle 32. The theoretical nozzle would have a throat smaller than the throat 38 which is dimensioned according to the present invention so as to freely pass the liquid-vapor mixture being handled. Also, the theoretical nozzle would be limited to an axial length beyond which the fluid will leave the walls. Thus, the theoretical nozzle 32' would have a flow area at the lower discharge end which is too small to cover the required flow area occupied by the heat transfer tubes at the inlet end of the evaporator. Any attempt to enlarge the discharge end of the theoretical nozzle would ordinarily result in an erratic and incomplete filling of the diverging extended section beyond the theoretically correct diameter of the nozzle. Nevertheless, the nozzle 32 in accordance with the present invention is extended by the conical portion 40 to an enlarged discharge end 42 equal to the inlet flow area of the evaporator.

The foregoing modification of the theoretical De Laval type nozzle including the axial extension of the divergent section thereof, is made suitable because of the cooperating features of the inlet flow arrangement. In this regard, it will be appreciated by those skilled in the art that the design of a De Laval nozzle will be prescribed by the required weight rate of discharge therefrom into the inlet of the nozzle and the vacuum pressure at the evaporator inlet, based upon an adiabatic flow process through the nozzle. However, in accordance with the the present invention the inlet end is enlarged to produce a pressure drop from conduit 14 to the inlet end 36 causing flashing of the liquid into the liquid-vapor mixture and the throat is enlarged to handle the fluid at the density of the liquid-vapor mixture. Accordingly, the temperature of the feed liquid in conduit 14 is higher than the temperature of the fluid entering inlet 36 which in turn is higher than the fluid entering the tubes of the evaporator since expansion of the fluid occurs in two stages. Initial expansion alters the condition of the fluid before it enters the nozzle 32 causing the fluid to behave in a manner entirely different from that expected in the normal De Laval nozzle 32'. Further, a large portion of the energy usually available to produce the fluid expansion within the De Laval type nozzle, is dissipated before the fluid enters the nozzle 32 so that the relative influence of gravity on the fluid passing through the nozzle section 40 is increased.

The feed liquid 44 is therefore conducted by the conduit 14 to a diverging expansion nozzle 46 in order to convert the feed liquid into the liquid-vapor mixture 48 consisting of gaeous bubbles entrained within liquid. The conversion of the feed liquid into the liquid-vapor mixture results from the flashing of the feed liquid when expanding through the diverging nozzle 46 and entering the horizontally elongated conduit section 50 of sufficient length to accommodate the expansion process. Accordingly, a reduction in pressure and temperature occurs as the liquid 44 is converted into the liquid-vapor mixture 48 accompanied by an increase in fluid velocity which may be non-uniformally distributed across the flow area of conduit 50.

Connected to the horizontally elongated conduit section 50 is a 90° elbow 52 through which the liquid-vapor mixture is conducted so as to dissipate part of the kinetic energy acquired from the preceding expansion of the fluid to reduce the non-uniform components of velocity that may exist in conduit 50. Further, the elbow 52 is operative to change the direction of the fluid flow so as to bring it under the influence of gravity. Connecting the elbow 52 to the inlet 36 of the De Laval type nozzle 32, is a vertically elongated conduit section 54. Like the conduit section 50, the conduit section 54 has a constant flow area and is of a sufficient length to stabilize flow and remove turbulence caused by passage of the fluid through the elbow. Subsequent passage of the liquid-vapor mixture through the throat 38 of the nozzle 32 is therefore assured. The fluid which passes through the nozzle 32 is therefore in the form of a foam or froth the bubbles of which expand and provide a large surface area for evaporation of more vapor from the liquid as the fluid passes downwardly and fills the extended conical portion 40.

The velocity of the fluid passing through the nozzle 32 is not rapid enough to be unaffected by gravity for which reason it is passed downwardly through the vertically positioned nozzle after leaving the elbow 52. Further, the discharge end 42 of the conical extension 40 of the nozzle 32, is vertically spaced from and connected to the inlet end of the evaporator by the conduit section 56. The length of section 56 is sufficient to allow the body of the liquid vapor mixture, which has separated from the walls as shown in FIGURE 5, to regain contact with the walls when reaching the inlet end of the evaporator. The liquid-vapor mixture falls away from the walls of the conical section 40 at its lower end because of the influence of gravity thereon. Accordingly, the flow pattern of the liquid-vapor mixture when reaching the inlet end will have expanded to the flow area of the inlet end in order to uniformly cover the inlet ends of all of the heat transfer tubes 22.

From the foregoing description, the construction, operation and utility of the inlet flow device 10 will be apparent. It will therefore be appreciated that the inlet flow device utilizes a De Laval type nozzle modified as described. The feed liquid which is at a higher temperature than the temperature corresponding to the vacuum at the inlet 26 of the evaporator, undergoes a two stage expansion. The feed liquid is therefore converted into a liquid-vapor mixture during initial expansion reducing the temperature while increasing in volume and velocity. The direction changing elbow 52 and conduits 50 and 54 prevent any turbulence in the fluid from influencing flow into the nozzle 32. The liquid-vapor mixture is then expanded through the nozzle 32 and passes downwardly through the extended conical portion 40 accelerated partly by its expansion and partly by the influence of gravity. Because of the influence of gravity, the conduit section 56 may be provided so that the spray pattern of the liquid-vapor mixture may have an opportunity to regain contact with the walls when expanded to the inlet flow area of the evaporator to thereby assure that the uniform coverage of the evaporator tubes is obtained. Any suitable means such as the mounting flange 38 and fasteners 30 may be utilized to secure the inlet flow device to the inlet end of the evaporator while the throat 38 may be machined from a solid section 58 equal in diameter to the conduit 54.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tube type evaporator having a plurality of vertical heat transfer tubes and an upper inlet end adapted to receive a liquid-vapor mixture derived from a source of flowing liquid at a relatively higher temperature and pressure, expansion inlet means communicating with said heat transfer tubes at the inlet end of the evaporator and connected to said source of liquid comprising, a downwardly discharging De Laval type nozzle having a throat dimensioned to freely pass said liquid-vapor mixture and a divergent outlet end equal in flow area and shape to the inlet end of the evaporator, volumetric expansion means connected to said source of liquid for converting said liquid into the liquid-vapor mixture in response to expansion thereof, energy dissipating means connecting said expansion means to the De Laval type nozzle for reducing the kinetic energy of the liquid-vapor mixture and turbulence produced by said expansion of the liquid, and vertical conduit means connecting said divergent outlet end to the inlet end of the evaporator for allowing the liquid-vapor mixture to fully expand to the flow area of the inlet end of the evaporator.

2. The combination of claim 1 wherein said energy dissipating means comprises, an elbow for changing the direction of flow of the liquid-vapor mixture, and a vertically elongated flow rectifying conduit section of constant flow area connecting said elbow to the De Laval type of nozzle.

3. The combination of claim 2 wherein said expansion means comprises, a diverging nozzle connected to said source of liquid, and a flow rectifying horizontally elongated conduit section of constant flow area connecting said diverging nozzle to the elbow of the energy dissipating means.

4. The combination of claim 1 wherein said expansion means comprises, a diverging nozzle connected to said source of liquid, and a flow rectifying horizontally elongated conduit section of constant flow area connecting said diverging nozzle to the energy dissipating means.

5. In combination with an evaporator having a plurality of vertical heat transfer tubes and an upper inlet end adapted to receive a liquid-vapor mixture derived from a source of flowing liquid at a relatively higher temperature and pressure, expansion inlet means communicating with said heat transfer tubes at the inlet end of the evaporator and connected to said source of liquid comprising, a vertically positioned, downwardly discharging, convergingdiverging nozzle connected to the inlet end of the evaporator, vertically elongated conduit means of invariable cross-section connected to the nozzle for reducing turbulence in the liquid-vapor mixture supplied to the nozzle, expansion flow means connected to the source of liquid for conversion of the liquid into the liquid-vapor mixture at a lower temperature and increased velocity, and direction changing passage means connecting said expansion flow means to the vertically elongated conduit means for dissipating kinetic energy from the liquid-vapor mixture.

6. The combination of claim 5 wherein said nozzle is provided with an upper inlet end equal in flow area to the vertically elongated conduit means, a throat passage dimensioned to freely pass the liquid-vapor mixture and a lower outlet end dimensionally exceeding the flow area of the liquid-vapor mixture leaving the nozzle.

7. The combination of claim 6 including a conduit section connecting the outlet end of the nozzle to the inlet end of the evaporator having a vertical length accommodating expansion of the liquid-vapor mixture under the influence of gravity to a flow area equal to that of the inlet end of the evaporator.

References Cited by the Examiner
UNITED STATES PATENTS

| | | | |
|---|---|---|---|
| 1,582,066 | 4/1926 | Moore | 159—20 X |
| 2,411,186 | 11/1946 | Boeckeler | 159—7 |
| 3,074,473 | 1/1963 | Janovtchik | 159—2 |
| 3,141,807 | 7/1964 | Cook | 159—17 |
| 3,199,310 | 8/1965 | Schlichtig | 62—500 |

FOREIGN PATENTS

| | | |
|---|---|---|
| 202,722 | 7/1956 | Australia. |
| 174,049 | 8/1952 | Austria. |
| 784,847 | 8/1935 | France. |

NORMAN YUDKOFF, *Primary Examiner.*

J. SOFER, *Assistant Examiner.*